(12) United States Patent
Chang et al.

(10) Patent No.: US 9,977,549 B2
(45) Date of Patent: *May 22, 2018

(54) SINGLE SUBSTRATE TOUCH SENSOR (71) Applicant: Synaptics Incorporated, San Jose, CA (US)

(72) Inventors: Yi-Yun Chang, Taipei (TW); Yeh-Cheng Tan, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/679,996

(22) Filed: Apr. 6, 2015

(65) Prior Publication Data

US 2015/0212629 A1    Jul. 30, 2015

Related U.S. Application Data (63) Continuation of application No. 13/527,390, filed on Jun. 19, 2012, now Pat. No. 9,024,891.

(60) Provisional application No. 61/555,415, filed on Nov. 3, 2011.

(51) Int. Cl.
*G06F 3/044* (2006.01)
*H01R 43/20* (2006.01)

(52) U.S. Cl.
CPC ........... *G06F 3/044* (2013.01); *H01R 43/20* (2013.01); *G06F 2203/04103* (2013.01); *G06F 2203/04111* (2013.01); *G06F 2203/04112* (2013.01); *Y10T 29/49117* (2015.01)

(58) Field of Classification Search
CPC .......... G06F 3/041; G06F 3/045; G06F 3/044; G08C 21/00; G01D 7/00; B05D 5/12; B05D 1/38; B05D 3/10; C23C 14/34

USPC .......... 73/862.046; 178/20.01; 345/173, 174
See application file for complete search history.

(56) References Cited

U.S. PATENT DOCUMENTS

| 8,557,508 B2 | 10/2013 | Li et al. |
| 8,963,856 B2 | 2/2015 | Liu et al. |
| 9,081,453 B2 | 7/2015 | Bulea et al. |
| 2006/0260417 A1* | 11/2006 | Son ............ G01L 5/228 73/862.046 |
| 2009/0159344 A1 | 6/2009 | Hotelling et al. |

(Continued)

OTHER PUBLICATIONS

International Searching Authority, International Search Report and Written Opinion dated Mar. 4, 2013 for International Application No. PCT/US2012/060844.

(Continued)

*Primary Examiner* — Abdul-Samad A Adediran
(74) *Attorney, Agent, or Firm* — FBFK PC

(57) ABSTRACT

The embodiments described herein are related to capacitive input device, including a substrate, first sensor electrodes deposited on the substrate and arranged in a first direction, an insulating layer, connecting elements deposited on the insulating layer, and second sensor electrodes. The second sensor electrodes includes sensor electrode elements deposited on the substrate ohmically isolated from the first sensor electrodes. Each of the sensor electrode elements are connected to at least one other sensor electrode element. The capacitive input device may further include a routing elements deposited on the insulating layer, where each of the routing elements are coupled to one of the second sensor electrodes and is substantially disposed in the first direction.

17 Claims, 9 Drawing Sheets

(56) References Cited

U.S. PATENT DOCUMENTS

| | | | |
|---|---|---|---|
| 2009/0194344 A1 | 8/2009 | Harley et al. | |
| 2009/0242283 A1* | 10/2009 | Chiu | G06F 3/044 178/20.01 |
| 2010/0073319 A1 | 3/2010 | Lyon et al. | |
| 2010/0110031 A1* | 5/2010 | Miyazawa | G06F 3/0488 345/173 |
| 2010/0238133 A1* | 9/2010 | Wu | G06F 3/044 345/174 |
| 2010/0265193 A1* | 10/2010 | Kung | G06F 3/044 345/173 |
| 2011/0012845 A1 | 1/2011 | Rothkopf et al. | |
| 2011/0094670 A1 | 4/2011 | Grunthaner | |
| 2011/0109590 A1* | 5/2011 | Park | G06F 3/0412 345/174 |
| 2011/0132670 A1 | 6/2011 | Yeh et al. | |
| 2011/0141051 A1 | 6/2011 | Ryu | |
| 2011/0310033 A1* | 12/2011 | Liu | G06F 3/044 345/173 |
| 2012/0092270 A1* | 4/2012 | Lyon | G06F 3/03547 345/173 |
| 2012/0188195 A1* | 7/2012 | Fang | G01R 31/2832 345/174 |
| 2012/0256873 A1 | 10/2012 | Herman | |
| 2012/0262385 A1 | 10/2012 | Kim et al. | |
| 2013/0113752 A1 | 5/2013 | Chang et al. | |
| 2015/0185940 A1 | 7/2015 | Han et al. | |

OTHER PUBLICATIONS

International Preliminary Report on Patentability dated Jun. 9, 2016 for International Application No. PCT/US2014/065902. (10 pages).

* cited by examiner

SINGLE SUBSTRATE TOUCH SENSOR

CROSS-REFERENCE TO RELATED APPLICATIONS

The present application is a continuation of and, therefore, claims benefit under 35 U.S.C. 120 of U.S. patent application Ser. No. 13/527,390, filed on Jun. 19, 2012, and entitled "SINGLE SUBSTRATE TOUCH SENSOR." U.S. patent application Ser. No. 13/527,390 is incorporated herein by reference. Further, U.S. patent application Ser. No. 13/527,390 claims priority to U.S. Provisional Application No. 61/555,415, filed Nov. 3, 3011, and entitled "SINGLE SUBSTRATE TOUCH SENSOR."

TECHNICAL FIELD

This following generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In one embodiment, for example, a capacitive input device is provided. The capacitive input device may include, but is not limited to, a substrate, a plurality of first sensor electrodes deposited on the substrate and arranged in a first direction, an insulating layer, a plurality of connecting elements deposited on the insulating layer, a plurality of second sensor electrodes including a plurality of sensor electrode elements deposited on the substrate ohmically isolated from the plurality of first sensor electrodes, wherein each of the plurality of sensor electrode elements are connected to at least one other sensor electrode element arranged in a second direction by one of the plurality of connecting elements and a plurality of routing elements deposited on the insulating layer, wherein each of the plurality of routing elements coupled to one of the plurality of second sensor electrodes and is substantially disposed in the first direction.

In accordance with another embodiment, for example, a method for constructing a capacitive input device is provided. The method may include, but is not limited to, providing a substrate, depositing a first array of sensor electrodes on the substrate, the first array of sensor electrodes arranged in rows in a first direction, depositing a plurality of sensor electrode elements on the substrate, the plurality of sensor electrode elements ohmically isolated from the first array of sensor electrodes, depositing an insulating layer over the first array of sensor electrodes and plurality of sensor electrode elements, depositing a plurality of connecting elements onto the insulating layer, wherein each of the plurality of connecting elements ohmically couple two of the plurality of sensor electrode elements arranged in a second direction to form a second array of sensor electrodes arranged in the second direction, and depositing a plurality of routing traces onto the insulating layer, wherein each routing trace is ohmically coupled to one of the sensor electrodes of the second array and each routing trace extends substantially along the first direction.

In accordance with another embodiment, a transcapacitive input device is provided. The transcapacitive input device may include, but is not limited to, a substrate, an insulating layer, a first array of sensor electrodes deposited in rows on the substrate, each of the first array of first sensor electrodes having a first major axis aligned in a first direction, a plurality of connecting elements deposited on the insulating layer, a second array of sensor electrodes having a second major axis aligned in a second direction substantially perpendicular to the first direction, wherein the second array of sensor electrodes includes a plurality of sensor electrode elements deposited on the substrate ohmically isolated from the first array of sensor electrodes, wherein each of the plurality of sensor electrode elements are connected to at least one other sensor electrode element arranged in the second direction by one of the plurality of connecting elements, and the transcapacitive input device may further include a plurality of routing elements deposited on the insulating layer, wherein each of the plurality of routing elements coupled to one of the electrodes of the second array and is substantially disposed in the first direction.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
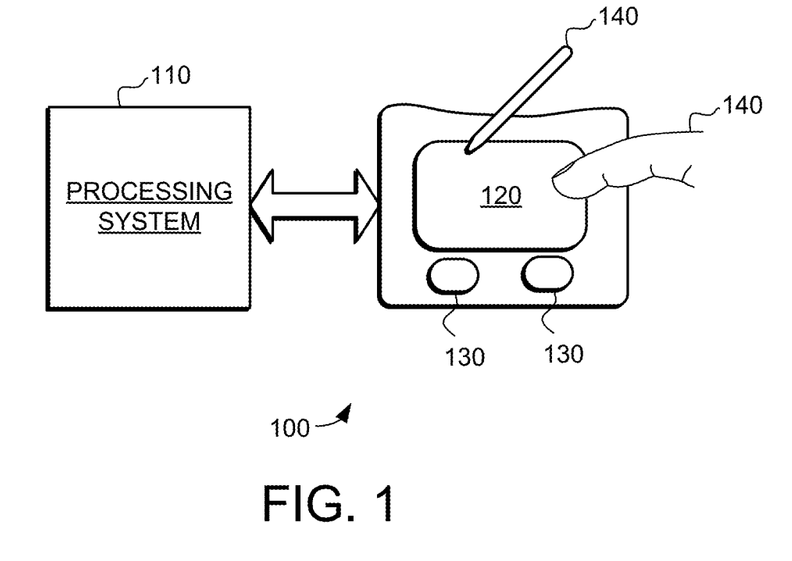
FIG. 1 is a block diagram of an exemplary system that includes an input device, in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
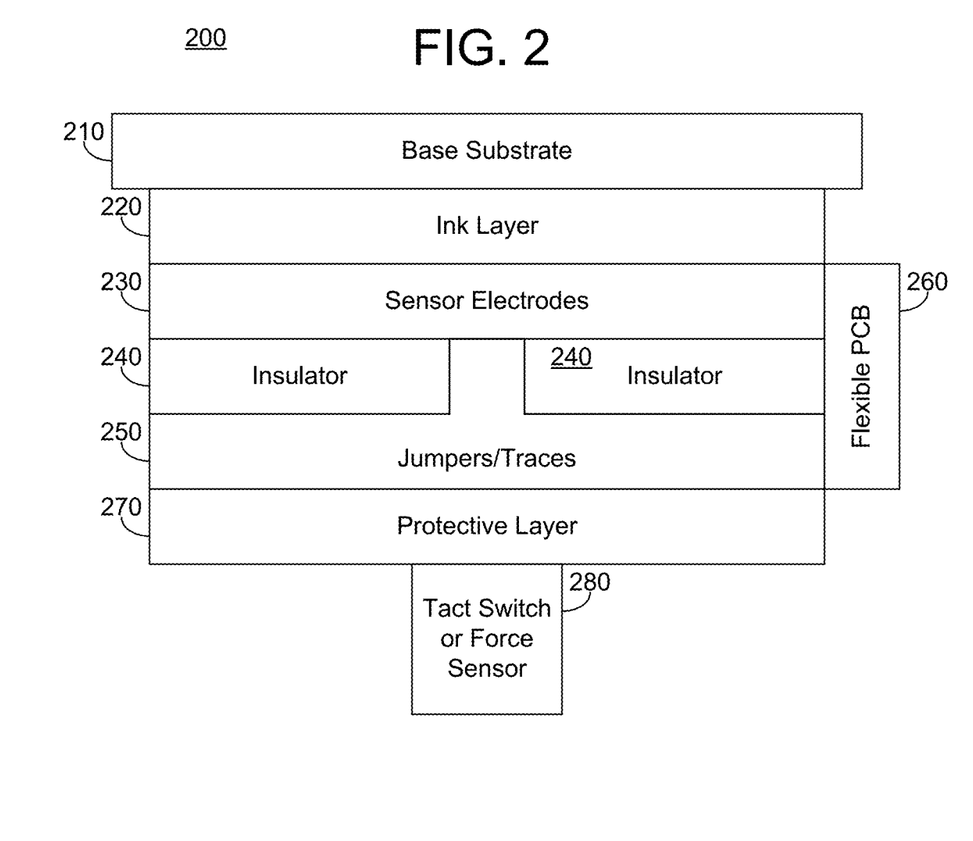
FIG. 2 is a block diagram of an input device, in accordance with an embodiment.

FIG. 2 is a block diagram of an input device 200, in accordance with an embodiment. The input device includes a base substrate 210. The base substrate 210 may be configured to be touched by input objects when part of an electronic device. Base substrate 210 may be any suitable substrate for contact with an input object, such as glass, Mylar, PET (Polyethylene terephthalate), plastic, printed circuit boards, flexible printed circuit substrates and the like. The base substrate 210 could also be patterned, etched or otherwise marked for improved tactile feel and/or visual appeal. In one embodiment, for example, the input device 200 may include an optional ink layer 220 which may be used to provide artwork or some other visible markings that can be seen by the user if the base substrate 210 is substantially transparent (e.g. glass, PET, etc)

The input device 200 further includes a sensor electrode layer 230. The sensor electrode layer includes an array of sensor electrodes arranged in a first direction and an array of sensor electrode elements ohmically isolated from the array of sensor electrodes, as discussed in further detail below. The array sensor electrodes and array of sensor electrode elements can be coupled to sensor circuitry and sense input objects in a sensing region. The sensor electrodes and sensor electrode elements may be formed of any suitable conductive material, such as ITO (Indium tin oxide), copper, silver ink, carbon ink, and the like. In one embodiment, for example, the array of sensor electrodes may be coupled to a flexible printed circuit board (PCB) 260 which ohmically couples the array sensor electrodes to a processing system of the input device 200.

The device further includes an insulating layer 240. The insulating layer 240 partially isolates the sensor electrodes from a layer connecting elements 250. The layer of connecting elements ohmically connect some of the sensor electrode elements in the sensor electrode layer to a second array of sensor electrodes, as discussed in further detail below. Furthermore, the layer of connecting elements 250 ohmically couples the second array of sensor electrode elements to a processing system of the input device 200. In one embodiment, a flexible PCB 260 ohmically couples the second array of sensor electrodes to the processing system of the input device 200. The input device 200 may also include a protective layer 270 to insulate and protect the connecting layer 250. In one embodiment, for example, the input device 200 may also include a tact switch(s) or force sensor(s) 280 configured to provide an indication of force from an input objects deflecting the input device. In such an embodiment, the input device 200 may be part of a click-pad type input device or a force-enhanced type input device. The click pad type device or force enhanced type input device, for example, may rotate about a single or multiple axes or otherwise deflect relative to a housing of the electronic system.

Figure 3:
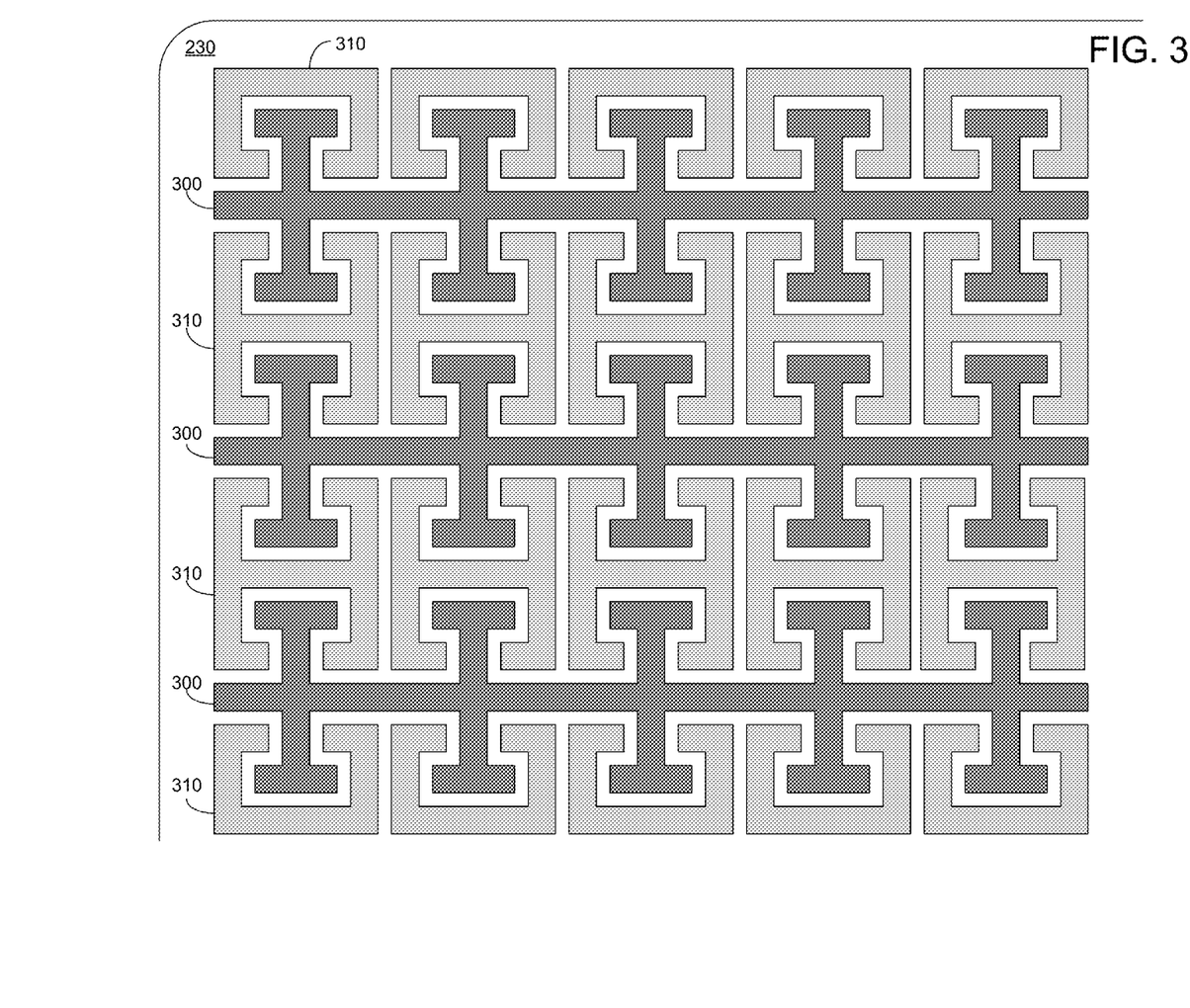
FIG. 3 illustrates an exemplary sensor electrode layer, in accordance with an embodiment.

FIG. 3 illustrates an exemplary sensor electrode layer 230, in accordance with an embodiment. The sensor electrode layer 230 includes an array of sensor electrodes 300 arranged in a first direction (the first direction is illustrated horizontally in FIG. 3). Each of the sensor electrodes 300 may be coupled to a processing system along a single side of the input device 200. The sensor electrode layer 230 also includes an array of sensor electrode elements 310. Each of the sensor electrode elements are ohmically isolated from the sensor electrodes 300 and are ohmically isolated from each other in the sensor electrode layer 230. As seen in FIG. 3, a portion of each sensor electrode element 310 is deposited between each of the sensor electrodes 300. As discussed in further detail below, the sensor electrode element 310 are ohmic ally coupled via connecting elements into a series of sensor electrodes arranged in a second direction (illustrated vertically in FIG. 3), which may be orthogonal to the first direction. Further, tracers are arranged over the portion of the sensor electrode element 310 that are deposited between each of the sensor electrodes 300 such that the traces do not cross over any portion of any of the sensor electrodes 300, as discussed in further detail below.

Figure 4:
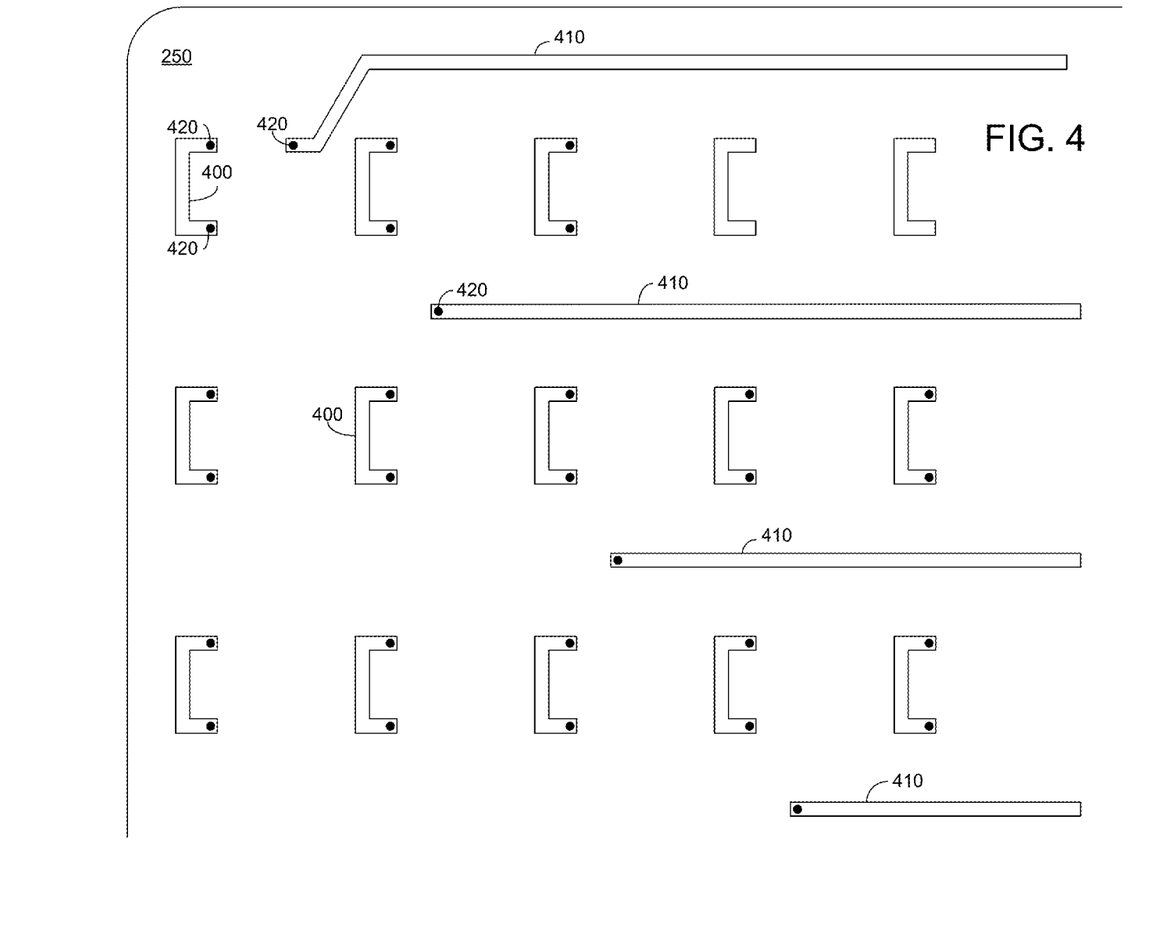
FIG. 4 illustrates an exemplary layer of jumpers and traces, in accordance with an embodiment.

FIG. 4 illustrates an exemplary layer of connecting elements 250, in accordance with an embodiment, where the layer includes a plurality of "jumpers" 400. Each of the jumpers ohmically couple two of the sensor electrode elements 310 arranged in the second direction (illustrated vertically in FIG. 4) with respect to each other. In one embodiment, each jumper is arranged over openings 420 in the insulating layer 240. Each opening 420 is configured to ohmically connect the jumper 400 to a sensor electrode elements 310 in the sensor electrode layer 300 through the insulation layer 240. The openings 420 may comprises conductive material or vias which are configured to ohmically coupled the jumper 400 to a sensor electrode 310. Accordingly, by connecting a series of sensor electrode elements 310 with jumpers 400 in the second direction, an array of sensor electrodes is formed substantially arranged in the second direction. The layer of connecting elements 250 further includes a series of routing traces 410. Each routing trace 410 is coupled to one of the sensor electrode elements 310 through an opening 420 and is substantially arranged in the first direction. Each trace 410 couples one of the sensor electrodes arranged in the second direction to the processing system 110 of the input device 200. Accordingly, since the traces 410 are substantially arranged in the first direction and the array of sensor electrodes 300 are substantially arranged in the first direction, all of the routing traces for the input device 200 can be arranged on a single edge of the device (e.g., the right edge as illustrated in FIGS. 3-5), allowing the overall size of the input device to be reduced.

Figure 5:
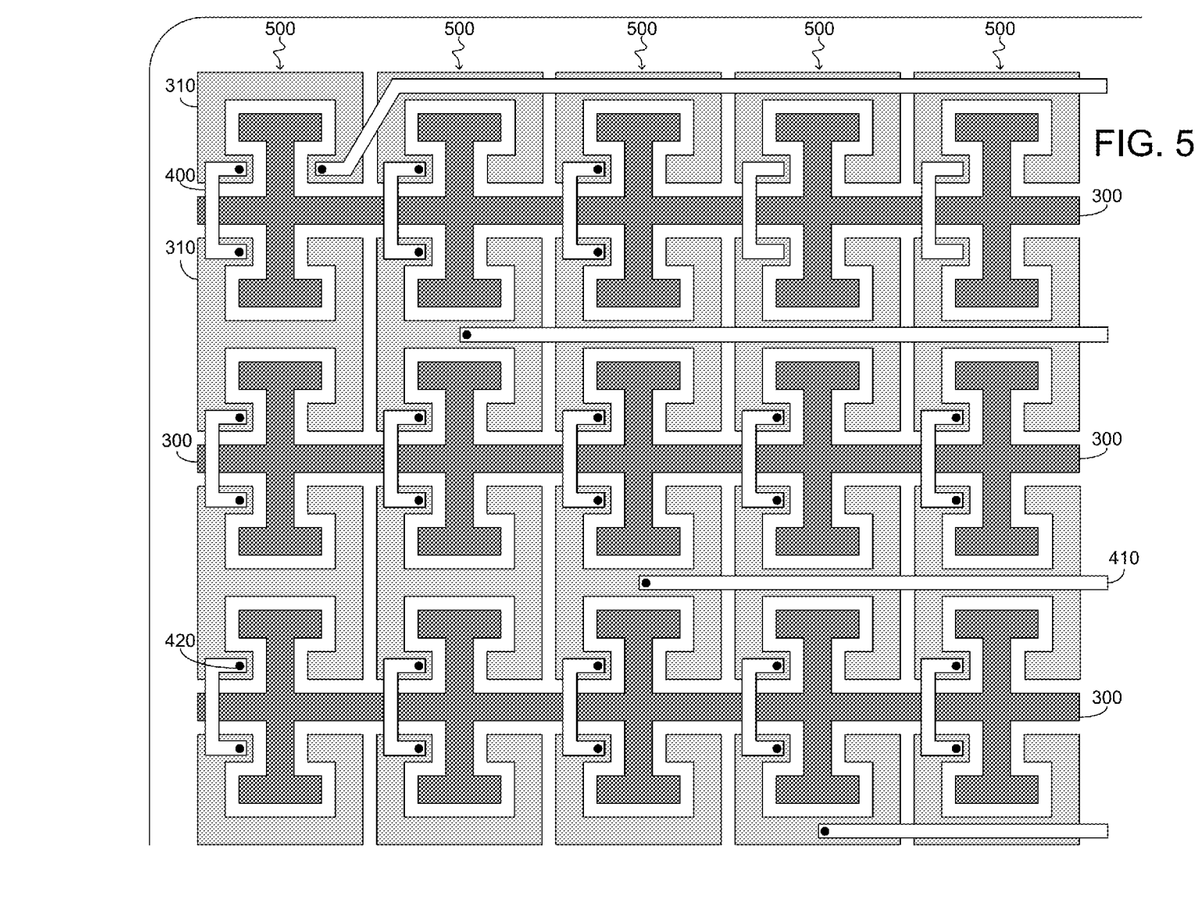
FIG. 5 illustrates a combination of the sensor electrode layer and the layer of jumpers and traces, in accordance with an embodiment.

FIG. 5 illustrates a combination of the sensor electrode layer 230 and the layer of connectors 250, in accordance with an embodiment. It should be noted that the insulation layer 240 is arranged between the sensor electrode layer 230 and layer of connectors 250, however the insulation layer 240 is not illustrated in FIG. 5 so that the arrangement of the jumpers 400 and routing traces 410 over the sensor electrode layer 230 can be seen. As seen in FIG. 5, the jumpers 400 connect a series of sensor electrode elements 310 arranged in the second direction to form the second array sensor electrodes, hereinafter referred to as sensor electrodes 500. Each of the sensor electrodes 500 are connected to one of the routing traces 410. As seen in FIG. 5, the routing traces 410 are routed in the same direction as the sensor electrodes 300. In one embodiment, the routing traces 410 are arranged over a portion of the sensor electrode elements 310 arranged between each sensor electrode 300 such that the traces 410 do not overlap any portion of the sensor electrode 300. In one embodiment, for example, the sensor electrodes 500 may be transmitter sensor electrodes and the sensor electrodes 300 may be receiver sensor electrodes. In another embodiment, the routing traces 410 may each extend substantially the same length along the first direction. Thus the routing trace 410 for each electrode of the second array of sensor electrodes is substantially the same length.

Figure 6:
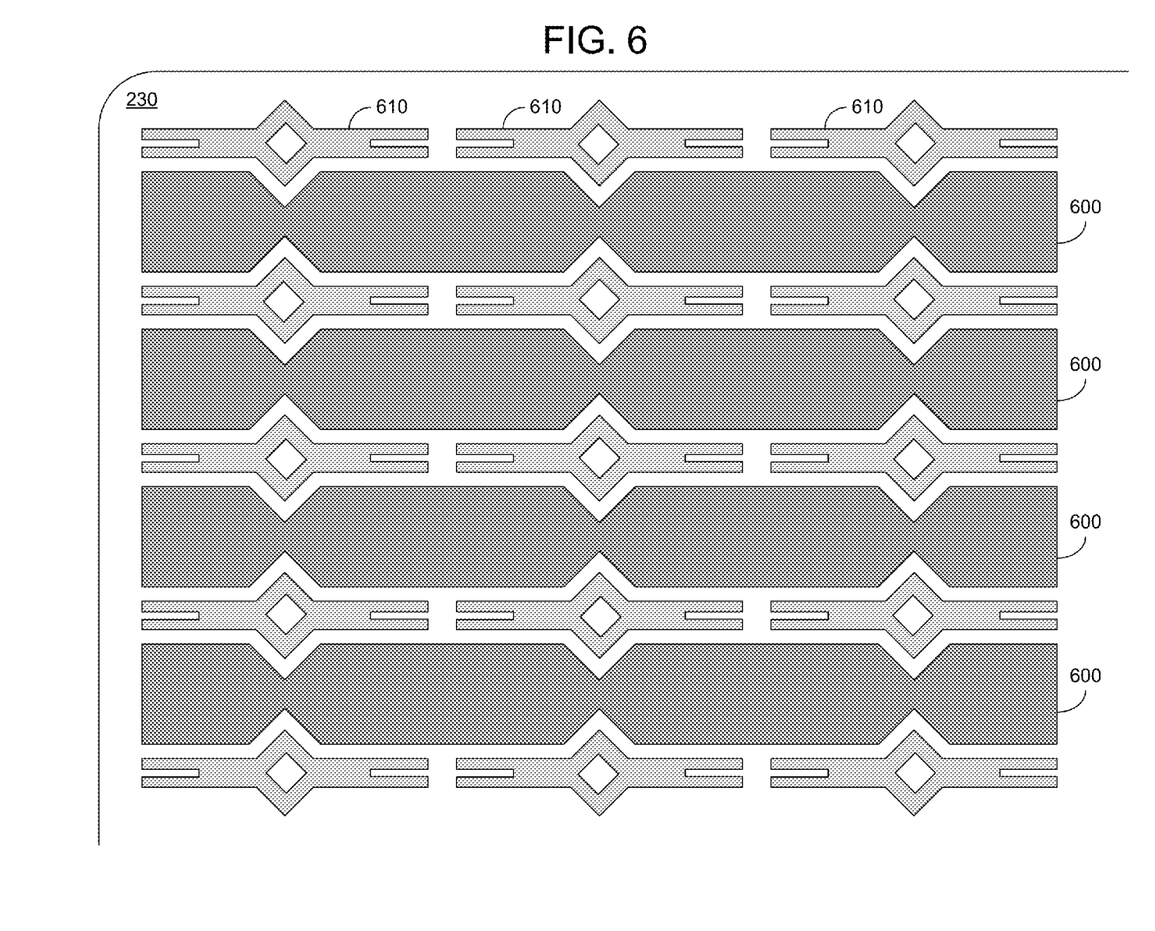
FIG. 6 illustrates another exemplary sensor electrode layer, in accordance with an embodiment.
Figure 7:
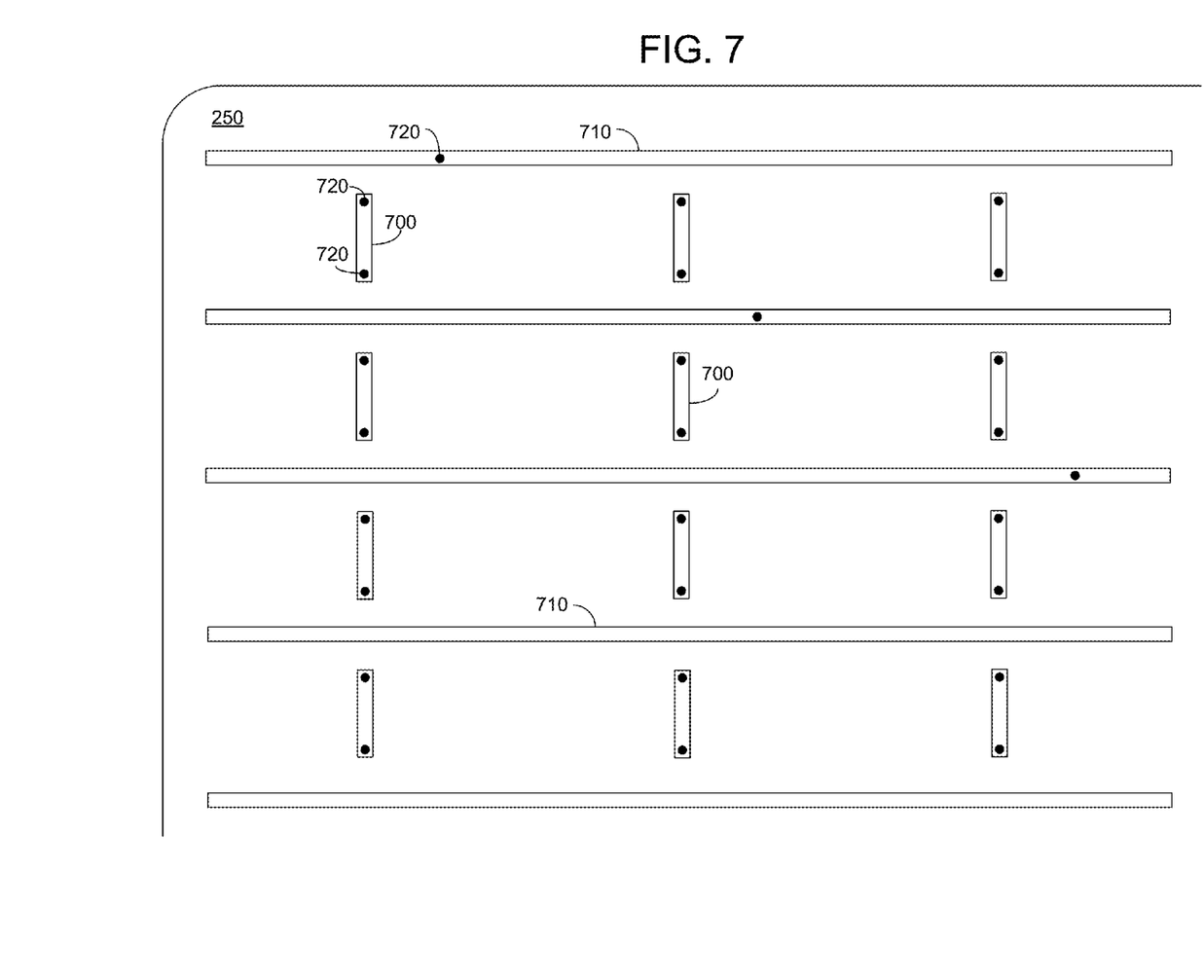
FIG. 7 illustrates another exemplary layer of jumpers and traces, in accordance with an embodiment.
Figure 8:
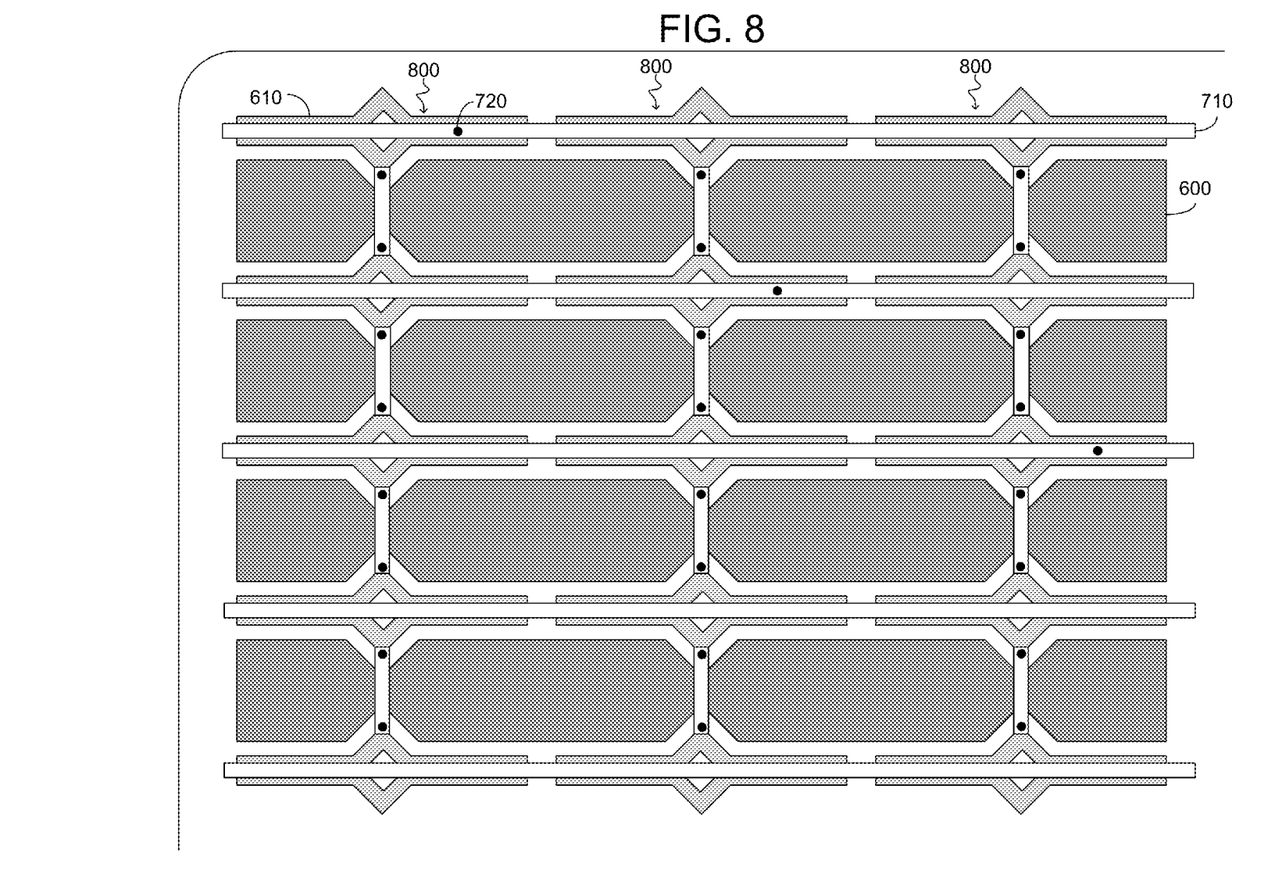
FIG. 8 illustrates a combination of the sensor electrode layer and the layer of jumpers and traces illustrated in FIGS. 6 and 7, in accordance with an embodiment.

FIGS. 6-8 illustrate another exemplary input device 200, in accordance with an embodiment. FIG. 6 illustrates an exemplary sensor electrode layer 230, in accordance with an embodiment. The sensor electrode layer 230 includes an array of sensor electrodes 600 arranged in a first direction (the first direction is illustrated horizontally in FIG. 3). Each of the sensor electrodes 600 may be coupled to a processing system along a single side of the input device 200. The sensor electrode layer 230 also includes an array of sensor electrode elements 610. Each of the sensor electrode elements are ohmically isolated from the sensor electrodes 600 and are ohmically isolated from each other in the sensor electrode layer 230. As seen in FIG. 6, the sensor electrode elements 610 are deposited between each of the sensor electrodes 600.

FIG. 7 illustrates an exemplary layer of connectors 250, in accordance with an embodiment. The layer of connectors 250 includes a series of jumpers 700. Each jumper 700 connects two of the sensor electrode elements 610 arranged in the second direction (illustrated vertically in FIG. 7) with respect to each other. Each jumper 700 is arranged over two openings 720 in the insulating layer 240. Each opening 720 is configured to ohmically connect the jumper 700 to a sensor electrode element 610 in the sensor electrode layer 230 through the insulation layer 240. Accordingly, by connected a series of sensor electrode elements 610 with jumpers 700 in the second direction, an array of sensor electrodes is formed substantially arranged in the second direction. The layer of connectors 250 further includes a series of routing traces 710. Each routing trace 710 is coupled to one of the sensor electrode elements 610 through an opening 720 and is substantially arranged in the first direction. Each routing trace 710 couples one of the sensor electrodes arranged in the second direction to the processing system 110 of the input device 200. Accordingly, since the routing traces 710 are substantially arranged in the first direction and the array of sensor electrodes 600 are substantially arranged in the first direction, all of the routing traces for the input device 200 can be arranged on a single edge of the device (e.g., the right edge as illustrated in FIGS. 6-8), allowing the overall size of the input device to be reduced.

FIG. 8 illustrates a combination of the sensor electrode layer 230 and the layer of connectors 250, in accordance with an embodiment. It should be noted that the insulation layer 240 including the openings 720 would be between the sensor electrode layer 230 and the layer of connectors 250, however the insulation layer 240 is not illustrated in FIG. 8 so that the arrangement of the jumpers 700 and routing traces 710 over the sensor electrode layer 230 can be seen. As seen in FIG. 8, the jumpers 700 connect a series of sensor electrode elements 610 arranged in the second direction to form sensor electrodes, hereinafter referred to as sensor electrodes 800. Each of the sensor electrodes 800 are connected to one of the routing traces 710. As seen in FIG. 8, the routing traces 710 are routed in the same direction as the sensor electrodes 600. In one embodiment, the routing traces 710 are arranged over a portion of the sensor electrode elements 610 arranged between each sensor electrode 600 such that the traces 710 do not overlap any portion of the sensor electrode elements.

While FIGS. 3-8 illustrate two exemplary input devices 200, one of ordinary skill in the art would recognize the shape and patterning of the first array of sensor electrodes and the second array of sensor electrode elements shown in the figures may vary. Furthermore, in other embodiments, the first array may comprise isolated elements, extend in another (non-horizontal) direction, and have a different shape than shown. Likewise, the second array may comprise non-isolated elements and have a different shape than shown.

Figure 9:
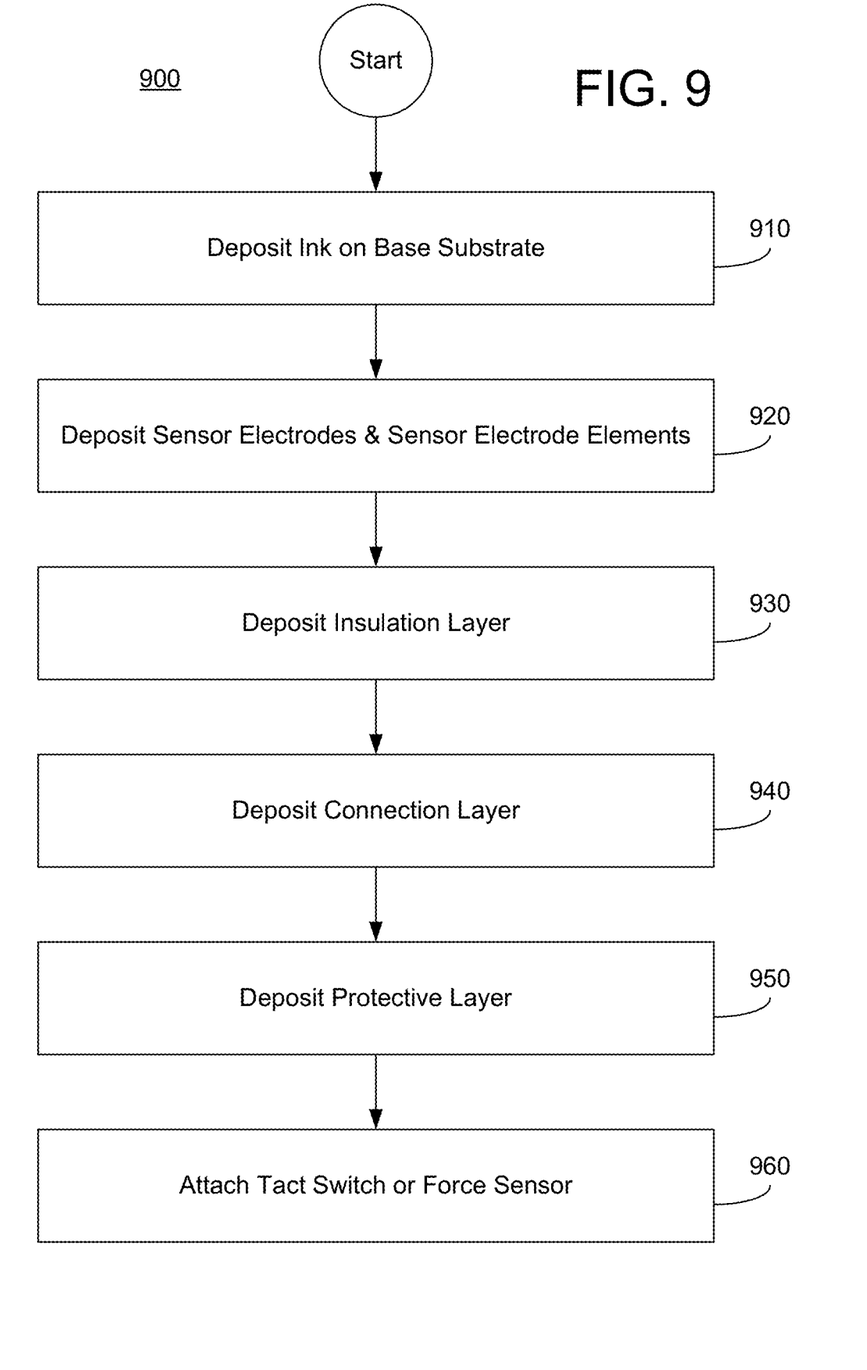
FIG. 9 is a flow chart illustrating an exemplary method for constructing an input device, in accordance with an embodiment.

FIG. 9 is a flow chart illustrating an exemplary method 900 for constructing an input device, in accordance with an embodiment. As discussed above, in one embodiment, an optional ink layer may first be deposited on a base substrate. (Step 910). Various types of inks and processes may be used to form visual artifacts on the base substrate. This is particularly advantageous if the base substrate is substantially transparent, allowing a user to see the printed pattern. A sensor electrode layer is then deposited on the base substrate. (Step 920). The sensor electrode layer includes a first array of sensor electrodes arranged in a first direction and an array of sensor electrode elements ohmically isolated from each other and are arranged to form the second array of sensor electrodes, as discussed above. An insulating layer may then be deposited onto the sensor electrode layer. (Step 930). The insulating layer may be patterned with holes or openings allowing ohmic connection to the sensor electrode layer through the insulating layer. A connection layer is then disposed onto the insulating layer. (Step 940). The connection layer may include jumpers, routing traces and bonding pads which facilitate connection to a processing system (e.g. via a flexible circuit board assembly). A protective layer is then disposed onto the connection layer. (Step 950). The protective layer may comprise a wet coated silicate or acrylic material. The protective layer is configured to provide insulation and protection to the other layers of the input device from humidity, abrasion and the like. In some embodiments, a tact switch, a force sensor or other similar mechanism is attached to the input device assembly. (Step 960). In some embodiments, a processing system may also be communicatively coupled to the sensor electrodes. A flexible circuit substrate may also be affixed to the edge of the input device assembly, providing communication between the sensor electrodes and the processing system. In one embodiment, the connections between the sensor electrodes and the processing system are made along only one edge of the sensor assembly.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. A capacitive input device, comprising:
   a substrate;
   a plurality of first sensor electrodes deposited on the substrate and arranged in a first direction, the plurality of first sensor electrodes each comprising a first portion that is a line of conductive material, and a repeating pattern of a second portion, the repeating pattern repeating along a length of the line, wherein the second portion comprises:
  a first T-shape of conductive material extending from and orthogonal to a first side of the line, and
  a second T-shape of conductive material extending from and orthogonal to a second side of the line;
an insulating layer;
a plurality of connecting elements deposited on the insulating layer;
a plurality of second sensor electrodes arranged in a second direction orthogonal to the first direction, the plurality of second sensor electrodes comprising:
  a plurality of sensor electrode elements deposited on the substrate and ohmically isolated from the plurality of first sensor electrodes, wherein the plurality of sensor electrode elements each surround, on three sides, the first T-shape and the second T-shape of adjacent first sensor electrodes in the plurality of first sensor electrodes,
    wherein each of the plurality of sensor electrode elements are connected to at least one other sensor electrode element by one of the plurality of connecting elements; and
  a plurality of routing elements deposited on the insulating layer,
    wherein each of the plurality of routing elements is coupled to one of the plurality of second sensor electrodes and is disposed in the first direction, and wherein each of the plurality of second sensor electrodes is directly and electrically connected to one of the plurality of routing elements, and each of the plurality of routing elements is directly and electrically connected to one of the plurality of second sensor electrodes, and
  wherein each of the plurality of routing elements is overlapped by at least one of the plurality of sensor electrode elements.

2. The capacitive input device of claim 1, wherein the plurality of routing elements are arranged on the insulating layer that is over a portion of the sensor electrode elements disposed between each row of the plurality of first sensor electrodes.

3. The capacitive input device of claim 1, further comprising a processing system communicatively coupled to the plurality of first sensor electrodes and the plurality of second sensor electrodes, wherein the processing system is connected to the plurality of second sensor electrodes via the plurality of routing elements on one edge of the substrate.

4. The capacitive input device of claim 1, wherein the plurality of first sensor electrodes are receiver sensor electrodes and the plurality of second sensor electrodes are transmitter sensor electrodes.

5. The capacitive input device of claim 1, further comprising at least one force sensor configured to provide an indication of a pressure applied to the substrate.

6. The capacitive input device of claim 1, wherein the substrate comprises a printed circuit board and polyethylene terephthalate.

7. The capacitive input device of claim 6, further comprising a cover layer indicia deposited on a first side of the substrate and configured to be touched by input objects.

8. A method for constructing a capacitive input device, the method comprising:
  providing a substrate;
  depositing a first array of sensor electrodes on the substrate, the first array of sensor electrodes arranged in a first direction, the first array of sensor electrodes each comprising a first portion that is a line of conductive material in the first direction, and a repeating pattern of a second portion, the repeating pattern repeating along a length of the line, wherein the second portion comprises:
    a first T-shape of conductive material extending from and orthogonal to a first side of the line, and
    a second T-shape of conductive material extending from and orthogonal to a second side of the line;
  depositing a plurality of sensor electrode elements on the substrate, the plurality of sensor electrode elements ohmically isolated from the first array of sensor electrodes, wherein the plurality of sensor electrode elements each surround, on three sides, the first T-shape and the second T-shape of adjacent sensor electrodes in the first array of sensor electrodes;
  depositing an insulating layer over the first array of sensor electrodes and the plurality of sensor electrode elements;
  depositing a plurality of connecting elements onto the insulating layer, wherein each of the plurality of connecting elements ohmically couple two of the plurality of sensor electrode elements arranged in a second direction, orthogonal to the first direction, to form a second array of sensor electrodes arranged in the second direction; and
  depositing a plurality of routing traces onto the insulating layer,
    wherein each routing trace is ohmically coupled to one of the sensor electrodes of the second array and each routing trace extends along with the first direction,
    wherein each of the sensor electrodes of the second array is directly and electrically connected to one of the plurality of routing traces, and each of the plurality of routing traces is directly and electrically connected to one of the sensor electrodes of the second array, and
    wherein each of the plurality of routing elements is overlapped by at least one of the plurality of sensor electrode elements.

9. The method of claim 8, wherein the plurality of routing elements are deposited on the insulating layer that is over a portion of the sensor electrode elements disposed between each row of the first array of sensor electrodes.

10. An electronic system comprising a transcapacitive input device, the transcapacitive input device comprising:
  a substrate;
  an insulating layer;
  a first array of sensor electrodes deposited in rows on the substrate, each sensor electrode of the first array of first sensor electrodes having a first major axis aligned in a first direction, the first array of sensor electrodes each comprising a first portion that is a line of conductive material in the first direction, and a repeating pattern of a second portion, the repeating pattern repeating along a length of the line in the first direction, wherein the second portion comprises:
    a first T-shape of conductive material extending from and orthogonal to a first side of the line, and
    a second T-shape of conductive material extending from and orthogonal to a second side of the line;
  a plurality of connecting elements deposited on the insulating layer;

a second array of sensor electrodes having a second major axis aligned in a second direction perpendicular to the first direction, the second array of sensor electrodes comprising:
- a plurality of sensor electrode elements deposited on the substrate ohmically isolated from the first array of sensor electrodes, wherein the plurality of sensor electrode elements each surround, on three sides, the first T-shape and the second T-shape of adjacent sensor electrodes in the first array of sensor electrodes,
- wherein each of the plurality of sensor electrode elements are connected to at least one other sensor electrode element arranged in the second direction by one of the plurality of connecting elements; and
- a plurality of routing elements deposited on the insulating layer,
  - wherein each of the plurality of routing elements coupled to one of the sensor electrodes of the second array and is disposed in the first direction, and each of the sensor electrodes of the second array is directly and electrically connected to one of the plurality of routing elements, and each of the plurality of routing elements is directly and electrically connected to one of the sensor electrodes of the second array, and
  - wherein each of the plurality of routing elements is overlapped by at least one of the plurality of sensor electrode elements.

11. The electronic system of claim 10, wherein the plurality of routing elements are arranged on the insulating layer that is over a portion of the sensor electrode elements disposed between each row of the first array of sensor electrodes.

12. The electronic system of claim 10, further comprising a processing system communicatively coupled to the first array and the second array, wherein the processing system is connected to the first array and the second array along only one edge of the substrate.

13. The electronic system of claim 12, wherein the substrate is configured to rotate about an axis.

14. The electronic system of claim 13, further comprising at least one sensor coupled to the substrate, the at least one sensor configured to provide an indication of a pressure applied to the substrate.

15. The electronic system of claim 13, wherein the at least one sensor is a tact switch.

16. The electronic system of claim 13, wherein the at least one sensor is a force sensor.

17. The electronic system of claim 10, wherein the substrate comprises a printed circuit board and polyethylene terephthalate.

* * * * *